United States Patent  
Handigol et al.

(10) Patent No.: US 10,442,322 B2  
(45) Date of Patent: Oct. 15, 2019

(54) EASY-ENTRY VEHICLE SEAT

(71) Applicant: BROSE FAHRZEUGTEILE GMBH & CO. KOMMANDITGESELLSCHAFT, COBURG, Coburg (DE)

(72) Inventors: Umesh Handigol, Rochester, MI (US); Ulf Hartmann, Lake Orion, MI (US)

(73) Assignee: BROSE FAHRZEUGTEILE GMBH & CO. KOMMANDITGESELLSCHAFT, Coburg (DE)

(*) Notice: Subject to any disclaimer, the term of this patent is extended or adjusted under 35 U.S.C. 154(b) by 0 days.

(21) Appl. No.: 15/816,290

(22) Filed: Nov. 17, 2017

(65) Prior Publication Data  
US 2019/0152352 A1 May 23, 2019

(51) Int. Cl.  
B60N 2/16 (2006.01)  
B60N 2/12 (2006.01)

(52) U.S. Cl.  
CPC ............. B60N 2/1695 (2013.01); B60N 2/12 (2013.01)

(58) Field of Classification Search  
CPC ................................ B60N 2/1695; B60N 2/12  
USPC ....... 297/16.1, 40, 44, 159.1, 191, 257, 313, 297/317, 325, 340, 341, 350, 378.1, 297/378.12, 378.13, 378.14  
See application file for complete search history.

(56) References Cited

U.S. PATENT DOCUMENTS

| 4,269,446 A | 5/1981 | Gersmann et al. |
| 5,588,707 A | 12/1996 | Bolsworth et al. |
| 5,662,368 A * | 9/1997 | Ito ..................... B60N 2/01583 296/65.05 |
| 5,683,140 A | 11/1997 | Roth et al. |
| 5,979,985 A | 11/1999 | Bauer et al. |
| 6,030,042 A | 2/2000 | Bauer et al. |

(Continued)

FOREIGN PATENT DOCUMENTS

| DE | 1780387 A1 | 1/1972 |
| DE | 2813534 C2 | 10/1979 |

(Continued)

OTHER PUBLICATIONS

Partial International Search Report dated Mar. 4, 2019, Application No. PCT/EP2018/081054, 13 pages.

(Continued)

Primary Examiner — Justin V Lewis  
(74) Attorney, Agent, or Firm — Lewis Roca Rothgerber Christie LLP

(57) ABSTRACT

The invention relates to a vehicle seat comprising: a seating portion having a seat frame with a pair of frame members and a cross member arranged between the pair of frame members; a seat base for supporting the seating portion; a height-adjustment mechanism for adjusting the height of the seat frame with respect to the seat base, and comprising at least one height-adjustment link; and an easy-entry mechanism for displacing the seating portion with respect to the seat base at least along a longitudinal axis between a use position and an easy-entry position, and comprising at least one easy-entry link being pivotably mounted on the seat base and pivotably connected with the height-adjustment link, the height-adjustment link connecting the easy-entry link with the cross member.

17 Claims, 9 Drawing Sheets

(56) References Cited

U.S. PATENT DOCUMENTS

| | | |
|---|---|---|
| 6,382,718 B1 | 5/2002 | Janke et al. |
| 7,300,109 B2 | 11/2007 | Hofmann et al. |
| 7,686,397 B2 | 3/2010 | Sahi |
| 9,145,071 B2 | 9/2015 | Bohm et al. |
| 9,511,687 B2 | 12/2016 | Seibold et al. |
| 9,944,204 B2 | 4/2018 | Salvia, III et al. |
| 2002/0060487 A1 | 5/2002 | Makosa |
| 2004/0051361 A1 | 3/2004 | Rausch et al. |
| 2004/0075322 A1 | 4/2004 | Jaeger et al. |
| 2005/0110323 A1 | 5/2005 | Hofmann et al. |
| 2006/0145524 A1 | 7/2006 | Fischer et al. |
| 2008/0030060 A1 | 2/2008 | Schwingenschlogel et al. |
| 2010/0052390 A1 | 3/2010 | Dagcioglu et al. |
| 2010/0194134 A1 | 8/2010 | Ehrhard et al. |
| 2010/0289313 A1 | 11/2010 | Moegling et al. |
| 2011/0316317 A1 | 12/2011 | Sprenger et al. |
| 2013/0069405 A1 | 3/2013 | Schehl et al. |
| 2013/0320736 A1 | 12/2013 | Teufel et al. |
| 2015/0375643 A1 | 12/2015 | Fisher et al. |
| 2016/0318424 A1 | 11/2016 | Dlugokecki et al. |
| 2018/0141476 A1 | 5/2018 | Tobata et al. |
| 2018/0215288 A1 | 8/2018 | Hiemstra et al. |

FOREIGN PATENT DOCUMENTS

| | | |
|---|---|---|
| DE | 19646470 B4 | 5/1998 |
| DE | 19860234 C1 | 5/2000 |
| DE | 10020923 A1 | 12/2001 |
| DE | 20015115 U1 | 1/2002 |
| DE | 10057660 C1 | 4/2002 |
| DE | 10057724 B4 | 5/2002 |
| DE | 10355765 A1 | 6/2005 |
| DE | 102004057471 B4 | 6/2006 |
| DE | 102005017403 B4 | 10/2006 |
| DE | 102005050742 B4 | 4/2007 |
| DE | 102006002823 B4 | 8/2007 |
| DE | 102007012429 B4 | 9/2008 |
| DE | 102008057641 A1 | 5/2010 |
| DE | 102010040424 A1 | 5/2011 |
| DE | 102011018330 B4 | 10/2012 |
| DE | 102013205459 B4 | 10/2014 |
| DE | 102013225123 A1 | 6/2015 |
| DE | 102014225692 B4 | 3/2016 |
| DE | 102015222133 A1 | 5/2017 |
| EP | 120817 A1 | 10/1984 |
| EP | 1397269 B1 | 3/2006 |
| EP | 1615796 B1 | 2/2008 |
| EP | 1892143 A2 | 2/2008 |
| EP | 2028039 B1 | 10/2015 |
| FR | 2917679 | 12/2008 |
| GB | 2051569 A | 1/1981 |
| WO | WO 2011/120612 A1 | 10/2011 |
| WO | WO 2015/082672 A1 | 6/2015 |
| WO | WO 2017/080976 A1 | 5/2017 |

OTHER PUBLICATIONS

International Search Report dated Jun. 4, 2019, Application No. PCT/EP2018/081054, Jun. 4, 2019, 20 pages.

* cited by examiner

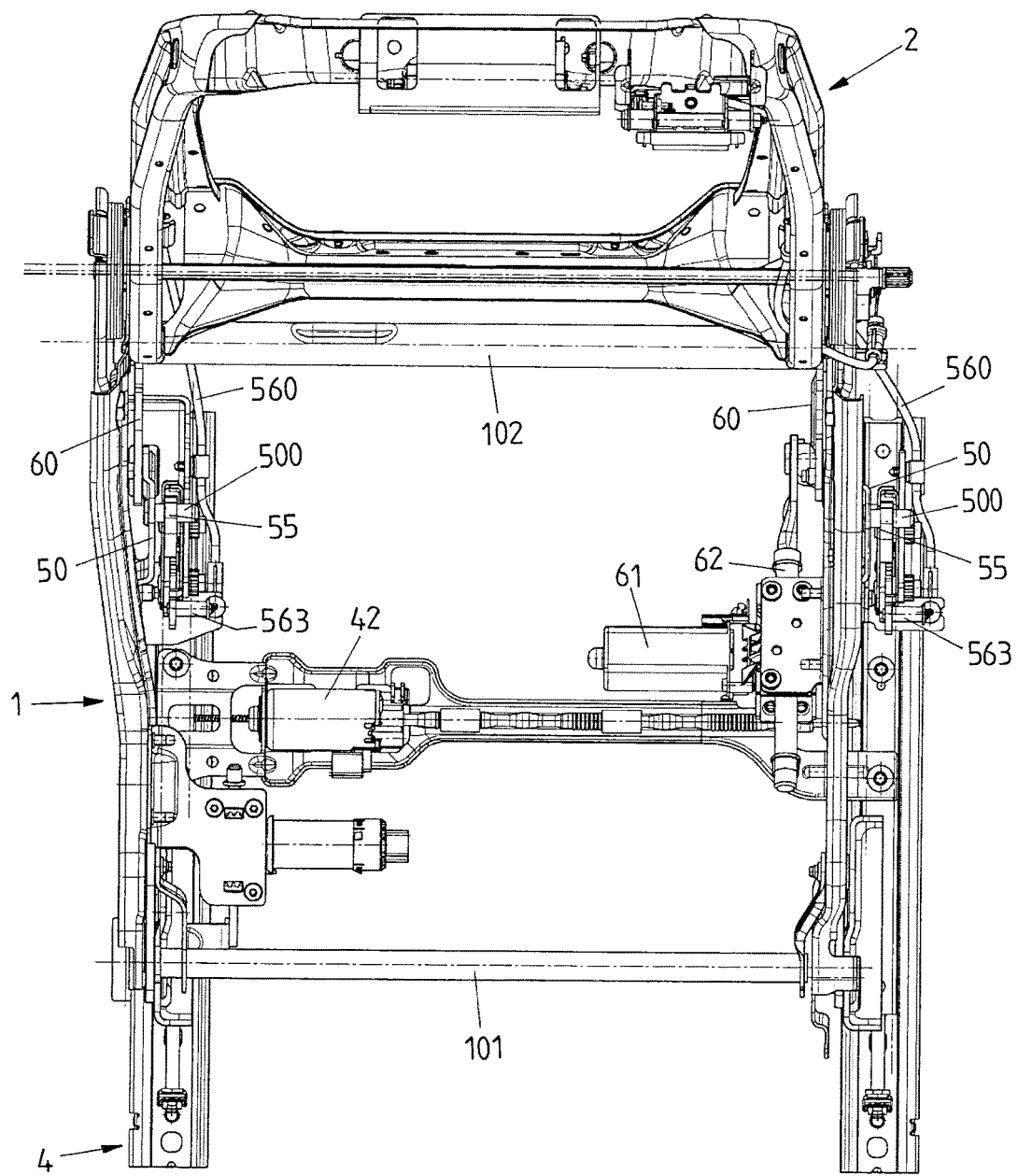

EASY-ENTRY VEHICLE SEAT

FIELD

The present invention relates to a vehicle seat having an easy-entry mechanism.

BACKGROUND

Vehicle seats with easy-entry mechanisms may be used, e.g., to provide a comfortable access for occupants to a second row in two-door vehicles or a third row in four-door vehicles. For this purpose, the vehicle seat may be displaced between a use position and an easy-entry position. Mechanisms are known in which a backrest portion of the vehicle seat is folded forward towards a seating portion, or in which the vehicle seat is longitudinally displaced by means of guide rails that also provide a longitudinal adjustment of the vehicle seat in the use position. In case of vehicle seats being adjusted by an actuator, e.g. an electric motor, the displacement of the vehicle seat between the use position and the easy-entry position is often slow and after activation of the mechanism the occupants have to wait to enter or exit the vehicle, or to take a seat in the use position. When the easy-entry mechanism shall be designed such that by returning into the use position, the vehicle seat comfortably assumes its previously adjusted longitudinal position, complex memory devices may become necessary.

DE 100 20 923 A1 describes a vehicle seat with an easy-entry mechanism and a height-adjustment mechanism. A swing arm is pivotably mounted on a seat frame traverse and on a seat base. Height-adjustment is effected by a complex arrangement having a large number of parts.

SUMMARY

It is an object to provide an improved vehicle seat with an easy-entry mechanism.

According to a first aspect, a vehicle seat, in particular for a motor vehicle, comprises a seating portion having a seat frame with a pair of frame members and a cross member arranged between the pair of frame members. The frame members may be spaced apart from one another. An occupant may take a seat on the seating portion. The vehicle seat further comprises a seat base adapted for supporting the seating portion. The vehicle seat comprises a height-adjustment mechanism adapted for adjusting the height of the seat frame with respect to the seat base. The height-adjustment mechanism comprises at least one height-adjustment link, e.g. in the form of a swing arm. The vehicle seat further comprises an easy-entry mechanism adapted for displacing the seating portion (in particular together with a backrest portion) with respect to the seat base along a longitudinal axis between a use position and an easy-entry position. In the use position, the occupant may take a seat on the vehicle seat. In the easy-entry position, access into a row of seats behind the vehicle seat may be facilitated, in particular by clearing a space occupied by the vehicle seat in the use position. The easy-entry mechanism comprises at least one easy-entry link being pivotably mounted on the seat base and pivotably mounted on the height-adjustment link. The easy-entry link may be formed as a swing arm. It is provided that the height-adjustment link connects the easy-entry link with the cross member. The easy-entry link is connected with the cross member via and by means of the height-adjustment link.

Such an improved vehicle seat may be designed less complex than known vehicle seats having easy-entry mechanisms. The kinematics of the height-adjustment mechanism and of the easy-entry mechanism may be designed with a small number of parts and particularly robust. Further, in contrast to known vehicle seats, operating the easy-entry mechanism does not necessarily readjust a longitudinal vehicle seat adjustment mechanism. Therefore, no memory device for storing the longitudinal position before displacement in the easy-entry position is necessary. The complexity of the vehicle seat may thus be further reduced.

Each of the frame members may be formed as a single part, or it may comprise a plurality of parts which are fixed to one another. The frame members may particularly be side members.

The height-adjustment mechanism may be coupled to the easy-entry mechanism, or it may be part of the easy-entry mechanism. Height adjustment may increase the comfort of the vehicle seat and may improve the security, since occupants of different height may adjust the seat for an optimal field of vision.

The easy-entry mechanism may be manually operable, or it may comprise a motor to displace the vehicle seat from the use position into the easy-entry position and vice-versa. The motor may be self-locking or non-self-locking.

In one embodiment, the height-adjustment link is rotatably mounted on the seat base, in particular by means of a pivot bearing. A rotation of the height-adjustment link with respect to the seat base may effect a height adjustment of the seating portion.

In one embodiment, the height-adjustment link is fixedly mounted on the cross member. In an alternative embodiment, the height-adjustment link is rotatably mounted on the cross member.

In one embodiment, the cross member is pivotably mounted on each of the pair of frame members.

In one embodiment, the cross member is a rod or tube or bar or stamped bracket, e.g., to provide a robust and light-weight configuration.

In one embodiment, the vehicle seat further comprises a backrest portion pivotably supported on the seating portion. The occupant may lean his or her back against the backrest portion when sitting on the seating portion. The seat base may support the backrest portion via the seating portion.

In one embodiment, a recliner pivotably connects the backrest portion with the seating portion. By means of the recliner, an angle of the backrest portion with respect to the seating portion may be adjusted.

In one embodiment, the backrest portion is adjustable with respect to the seating portion by means of the recliner without displacing the seating portion with respect to the seat base. Therefore, backrest portion angle and the seating portion longitudinal position may be adjusted separately without interfering with one another. This allows for an intuitive and easy adjustment of the vehicle seat.

In one embodiment, the recliner includes a first recliner part fixed to one of the frame members of the seat frame and a second recliner part fixed to a backrest frame of the backrest portion so that the backrest portion is supported by and mounted on the seating portion. The first recliner part and the second recliner part may be rotatably mounted to one another. The first and second recliner parts may be engaged with each other. The first and second recliner parts may be recliner fittings.

In one embodiment, the vehicle seat further comprises one or two (swing) arms, each arm being pivotably mounted on the seat base and pivotably connected with the frame member.

In one embodiment, the arm is (or the arms are) pivotably mounted on the seat base at a first position (or first positions), and the easy-entry link is (or the easy-entry links are) pivotably mounted on the seat base at a second position (at second positions). The first and second positions may be spaced apart from one another, in particular along the longitudinal axis.

In one embodiment, the vehicle seat comprises a backrest portion pivotably supported on the seating portion, wherein a recliner pivotably connects the backrest portion with the seating portion, and wherein the easy-entry link is located closer to the recliner than the (respective) arm. The arm or arms may be swing arms and arranged at a front region of the seat frame.

In one embodiment, the height-adjustment mechanism comprises a pair of height-adjustment links, and the easy-entry mechanism comprises a pair of easy-entry links. Each easy-entry link may be pivotably mounted on one of the pair of height-adjustments links. This arrangement allows a robust and simple construction of the vehicle seat.

In one embodiment, the vehicle seat further comprises a guide rail assembly mounted or mountable on a vehicle floor, adapted for adjusting the longitudinal position of the seating portion and the backrest portion with respect to the vehicle floor. The easy-entry mechanism may displace the vehicle seat between the use position and the easy-entry position without adjusting the guide rail assembly. The vehicle seat may comprise a motor for longitudinal adjustment of the vehicle seat. The easy-entry mechanism may move the vehicle seat from the use position into the easy-entry position and vice-versa without activating such longitudinal adjustment motor. The easy-entry mechanism may move the vehicle seat from the use position into the easy-entry position and vice-versa particularly quickly, because it is not necessary to activate the longitudinal adjustment motor, which may, e.g., be adapted to provide a precise but slow adjustment. In one embodiment, the seat base is mounted on an upper rail of the guide rail assembly, or it may comprise the upper rail of the guide rail assembly. The guide rail assembly may comprise a lower rail, wherein the upper rail is slidably engaged with the lower rail. The lower rail may be mounted or mountable on the vehicle floor.

In one embodiment, the vehicle seat further comprises an interlock mechanism adapted for locking the easy-entry mechanism in the use position when the vehicle seat is arranged in a full-forward position (or in the region of the full-forward position) of the guide rail assembly. By this, a collision of the vehicle seat with other parts of the vehicle may be avoided.

In one embodiment, the easy-entry mechanism further comprises a releasable latch or cam lock for restricting and releasing a pivoting motion of the easy-entry link with respect to the seat base. In this manner, the vehicle seat may be secured in the use position.

In one embodiment, the latch or cam lock is releasable by pivoting the backrest portion with respect to the seating portion. By this, the displacement of the vehicle seat from the use position into the easy-entry position may be effected in a particular easy and intuitive manner. Alternatively or in addition, another release mechanism may be provided. For example, the latch or cam lock may be releasable by means of a handle. One handle may release both at least one recliner for pivoting the backrest, and the latch or cam lock, e.g., by providing two or more cables connected with the handle, and with the one or more recliners and with the latch or cam lock. Further alternatively or in addition, the latch or cam lock may be releasable by displacing the seating portion along the longitudinal axis, in particular by a predetermined travel. Another option is to provide an actuator to release the latch or cam lock, in particular an electric actuator. The actuator may be operable by pushing a button.

In one embodiment, a bolt or striker wire is mounted on the easy-entry link, and the latch or cam lock may be engaged with the bolt or striker wire for locking the easy-entry link on the seat base to prevent a rotation of the easy-entry link with respect to the seat base. This may provide a simple and safe locking of the easy-entry mechanism in the use position. Alternatively, the releasable latch or cam lock is mounted on the easy-entry link, and the bolt or striker wire is mounted on the upper rail or on the seat base, in particular on a rear bracket of the seat base. According to another alternative, the both the latch or cam lock, and a counter piece, such as the bolt or striker wire, are mounted on the upper rail or seat base, e.g. on two sides of the easy-entry link. The latch or cam lock, and the counter piece may be engaged to secure the easy-entry link and disengaged to release the easy-entry link.

In one embodiment, the easy-entry mechanism further comprises one or more springs arranged such as to pre-tension the seating portion in direction of the easy-entry position. By this, the vehicle seat may simply be moved into the easy-entry position by unlocking a lock, e.g., the releasable latch or cam lock, and by applying no or only little force onto the vehicle seat, because once unlocked, the motion of the vehicle seat is effected or assisted by the spring or springs. Alternatively or additionally, the easy-entry mechanism comprises a drive motor for driving the vehicle seat between the use position and the easy-entry position.

According to a second aspect, a vehicle seat is provided, the vehicle seat comprising a seating portion having a seat frame with a frame member, a seat base for supporting the seating portion, and one or more first links, each first link having a first end and a second end, the first end being mounted on the seat frame member by means of a pivot bearing, so as to be pivotable with respect to the frame member. The second end is not mounted on the seat frame. The second end may face away from the seat frame. The vehicle seat further comprises an easy-entry mechanism for displacing the seating portion (in particular together with a backrest portion) with respect to the seat base along a longitudinal axis between a use position and an easy-entry position. The easy-entry mechanism comprises one or more second links, each second link being pivotably mounted on the second end of the first link by means of a pivot bearing and pivotably mounted on the seat base.

The improved vehicle seat according to the second aspect may obviously be combined with a vehicle seat according to the first aspect. Accordingly, features mentioned above with respect to an embodiment of a vehicle seat according to the first aspect may also be implemented in an embodiment of a vehicle seat according to the second aspect and vice versa.

In particular, the first link may be the height-adjustment link of the vehicle seat according to the first aspect, and the second link may be the easy-entry link of the vehicle seat according to the first aspect.

BRIEF DESCRIPTION OF THE DRAWINGS

The previously mentioned and other advantages of the present solution will be apparent to those skilled in the art upon consideration of the following specification and the attached drawings.

FIG. 5 is a top view of the vehicle seat according to FIG. 1;

DETAILED DESCRIPTION

Figure 1:
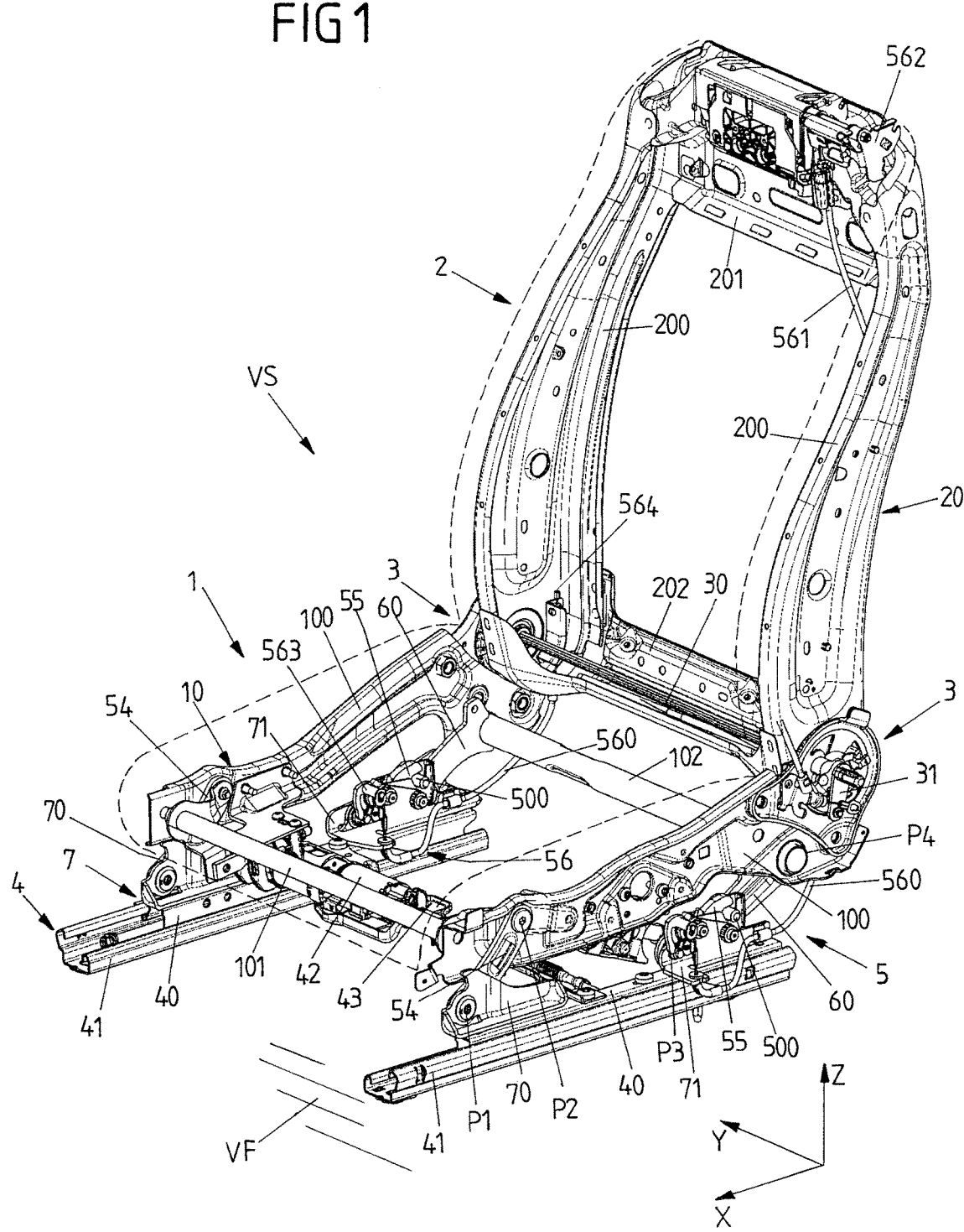
FIG. 1 is a perspective view on the right side of a vehicle seat having an easy-entry mechanism with releasable latches.

FIGS. 1-6B show a vehicle seat VS having a seating portion 1 and a backrest portion 2. The seating portion 1 comprises a seat frame 10. The seat frame 10 is adapted for supporting a seat cushion for an occupant. The backrest portion 2 comprises a backrest frame 20. The backrest frame 20 is adapted for supporting a backrest cushion for the occupant. The seat and backrest cushions are indicated with dashed lines in FIG. 1. The backrest frame 20 is mounted on the seat frame 10 by means of a pair of recliners 3.

The seat frame 10 comprises two frame members 100 arranged at the sides of the seating portion 1. The frame members 100 are connected to one another by a front rod 101 and a rear rod 102. The front and rear rods 101, 102 are arranged between the frame members 100. The frame members 100 will be referred to as side members 100 in the following. The side members 100 are elongate and generally extend along a longitudinal axis X. The front and rear rods 101, 102 generally extend along a lateral axis Y orthogonal to the longitudinal axis X. The backrest frame 20 comprises two side members 200 being connected to one another by means of an upper crossbar 201 and a lower crossbar 202.

The vehicle seat VS is adjustable in six directions. The angle of the backrest portion 2 with respect to the seating portion 1 is adjustable (forwards and backwards, around the lateral axis Y) by means of the recliners 3. A longitudinal position of the seating portion 1 and the backrest portion 2 along the longitudinal axis X with respect to a vehicle floor VF of a vehicle, to which the vehicle seat VS is mounted, is adjustable (forwards and backwards) by means of a guide rail assembly 4. A height of the seating portion 1 and the backrest portion 2 with respect to the vehicle floor VF along a vertical axis Z or within the XZ plane is adjustable (upwards and downwards) by means of a height-adjustment mechanism 6.

The longitudinal axis X, the lateral axis Y and the vertical axis Z together form a rectangular coordinate system.

The vehicle seat VS comprises a seat base 7. Seat base 7 includes a pair of front brackets 70 and a pair of rear brackets 71. An upper rail 40 of the guide rail assembly 4 may also be regarded as a part of the seat base 7. Alternatively, the vehicle floor may serve as seat base, e.g., when no guide rail assembly 4 is provided. The front and back brackets 70, 71 are fixed to the upper rail 40.

The vehicle seat VS further comprises an easy-entry mechanism 5. By means of the easy-entry mechanism 5, the seating portion 1 together with the backrest portion 2 may be displaced with respect to the seat base 7. In particular, the seating portion 1 and the backrest portion 2 are displaceable between a use or design position and an easy-entry position. In the use position, an occupant may take a seat on the vehicle seat VS. In the easy-entry position, the seat is moved forward along the longitudinal axis X in order to provide a free space for an occupant to enter a part of the vehicle behind the vehicle seat VS. Before the easy-entry mechanism 5 will be described in more detail below, the adjustment of the recliners 3, of the guide rail assembly 4 and of the height-adjustment mechanism 6 will be described.

For adjusting the angle of the backrest portion 2 with respect to the seating portion 1, each of the two recliners 3 comprises a first recliner fitting fixedly connected to the seat frame 10 (more precisely, to one of the side members 100 of the seat frame 10), and a second recliner fitting, fixedly connected to the backrest frame 20 (more precisely, to one of the side members 200 of the backrest frame 20). One or both of the recliners 3 may be locked at different angular positions of the first recliner fitting with respect to the second recliner fitting. A drive motor may be provided for adjusting the angular position.

For adjusting the longitudinal position of the vehicle seat VS, guide rail assembly 4 comprises two upper rails 40, each of which being slidably engaged with a respective lower rail 41. The lower rails 41 are connectable or connected with the vehicle floor VF, e.g. by means of bolts. In the example shown in FIG. 1, the guide rail assembly 4 comprises a drive motor 42. The drive motor 42 drives a spindle nut to rotate along a spindle in direction of the longitudinal axis X.

For adjusting the height of the seating portion 1 and the backrest portion 2, the vehicle seat VS comprises a four-bar linkage. As shown particularly in FIGS. 1-6B, the vehicle seat VS comprises four-bar linkage on both (left and right) sides of the vehicle seat VS. Each four-bar linkage comprises an arm 54 (or swing arm) and a height-adjustment link 60. On both sides, the arm 54, height-adjustment link 60, seat frame 10 side member 100 and seat base 7 (and upper rail 40) together form the four-bar linkage. Each four-bar linkage comprises four pivot bearings P1-P4. The arms 54 are pivotably mounted with one end on the front brackets 70 at a first pivot bearing P1. The respective other end of each of the arms 54 is pivotably mounted on the corresponding seat frame 10 side member 100 at a second pivot bearing P2, in the example shown in FIGS. 1-6B in the region of the front end of the side member 100. The height-adjustment links 60 each are pivotably mounted at a third pivot bearing P3 which will be described in more detail below with reference to the easy-entry mechanism 5. At their respective end opposite pivot bearing P3, the height-adjustment links 60 are fixed to the rear rod 102 of the seat frame 10. The rear rod 102 is rotatably connected with the side members 100 at a fourth pivot bearing P4. Alternatively, the rear rod 102 may be fixedly connected to the side members 100 and the height-adjustment links 60 may be pivotably mounted on the rear rod 102 at a fourth pivot bearing.

By pivoting the arms 54 and the height-adjustment links 60 forward or backward, the seat frame 10 describes a combined movement within the XZ plane respect to the seat base 7 and is lifted upwards (and forwards) or downwards (and backwards), respectively, so as to adjust the height of the vehicle seat VS. The height-adjustment mechanism 6 comprises a drive motor 61 to effect the height-adjustment. The drive motor 61 is fixedly mounted on one of the seat frame 10 side members 100. The drive motor 61 longitudinally displaces a spindle 62. The spindle 62 is pivotably connected with one of the height-adjustment links 60 at a position eccentric from the third pivot bearing. This height-adjustment link 60 may have an L-shaped configuration with a pivot bearing (the third pivot bearing P3) located at the corner of the L-shape, the connection to the cross member 102 at the end of the long part of the L-shape and the connection to the spindle 62 at the end of the short part of the L-shape.

By displacing the spindle 62 by means of the drive motor 61, the height-adjustment link 60 is rotated about the third pivot bearing P3 to effect height adjustment. When the easy-entry mechanism 5 is locked in the use position, the third pivot bearing P3 is arranged at a fixed position with respect to the seat base 7.

In the following, the easy-entry mechanism 5 will be described in more detail. On both sides of the vehicle seat VS, the easy-entry mechanism 5 comprises an easy-entry link 50. The easy-entry link 50 may be designed as a swing arm and/or as a plate-like member.

Figure 2:
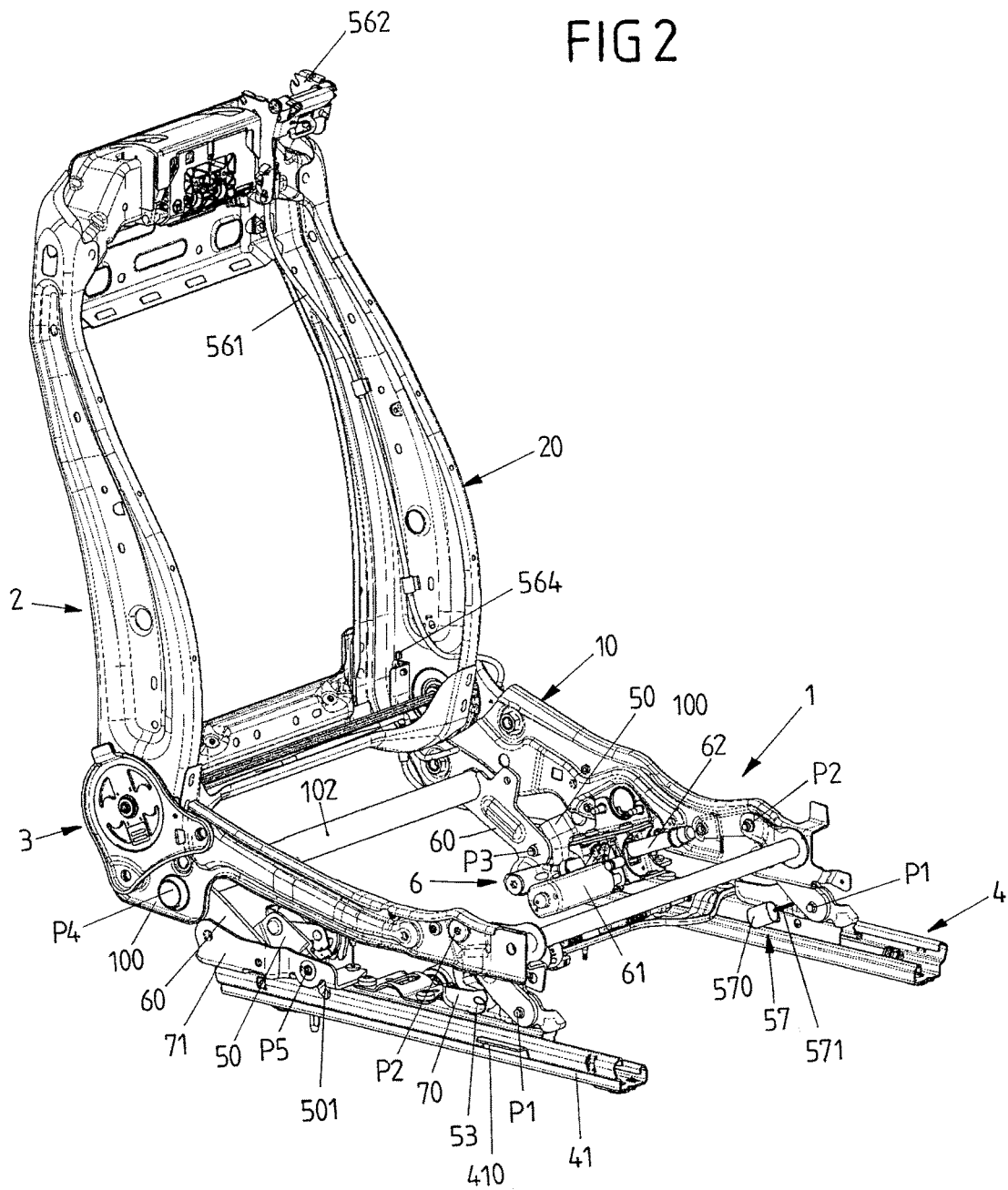
FIG. 2 is a perspective view on the left side of the vehicle seat according to FIG. 1.
Figure 3:
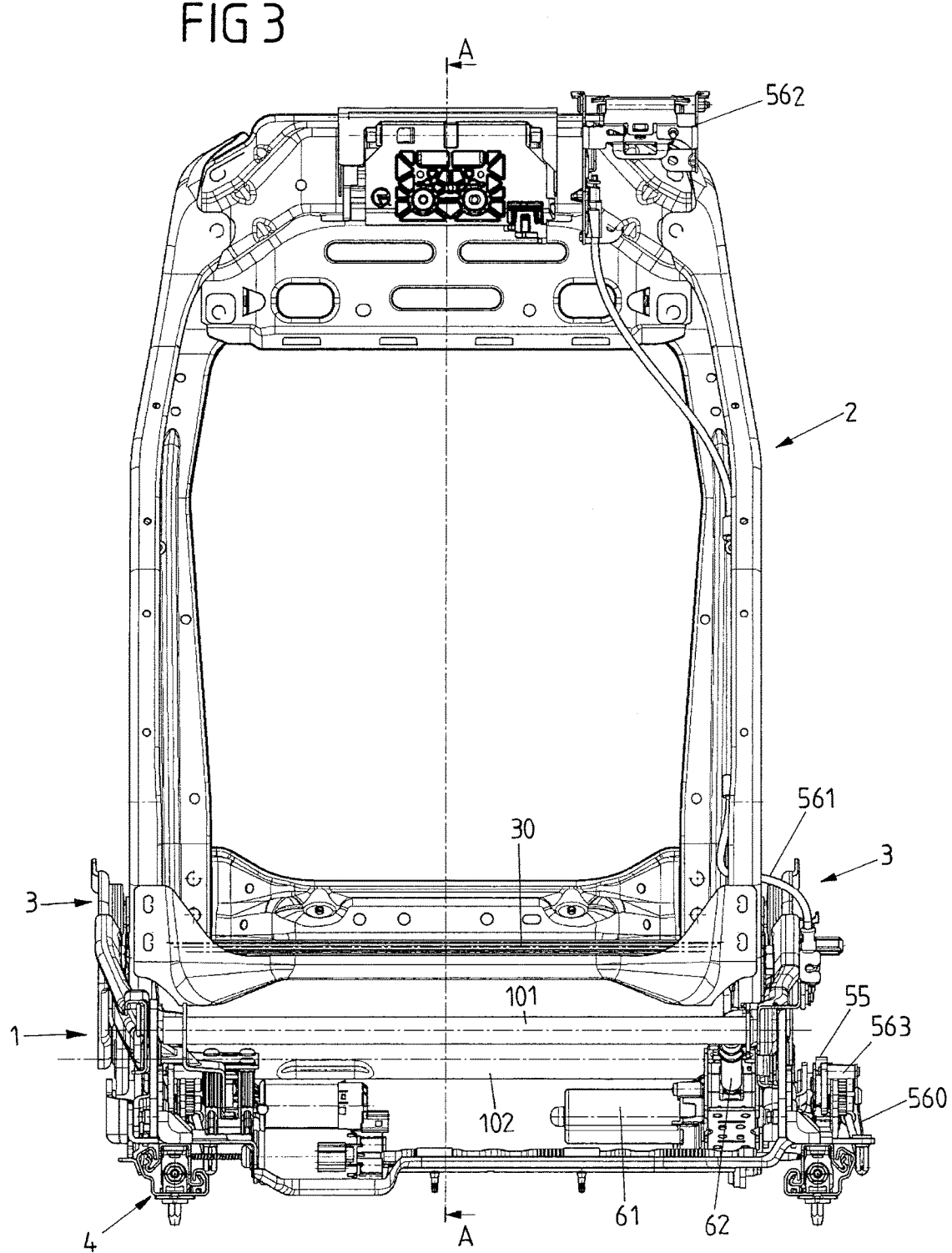
FIG. 3 is a front view of the vehicle seat according to FIG. 1.
Figure 4:
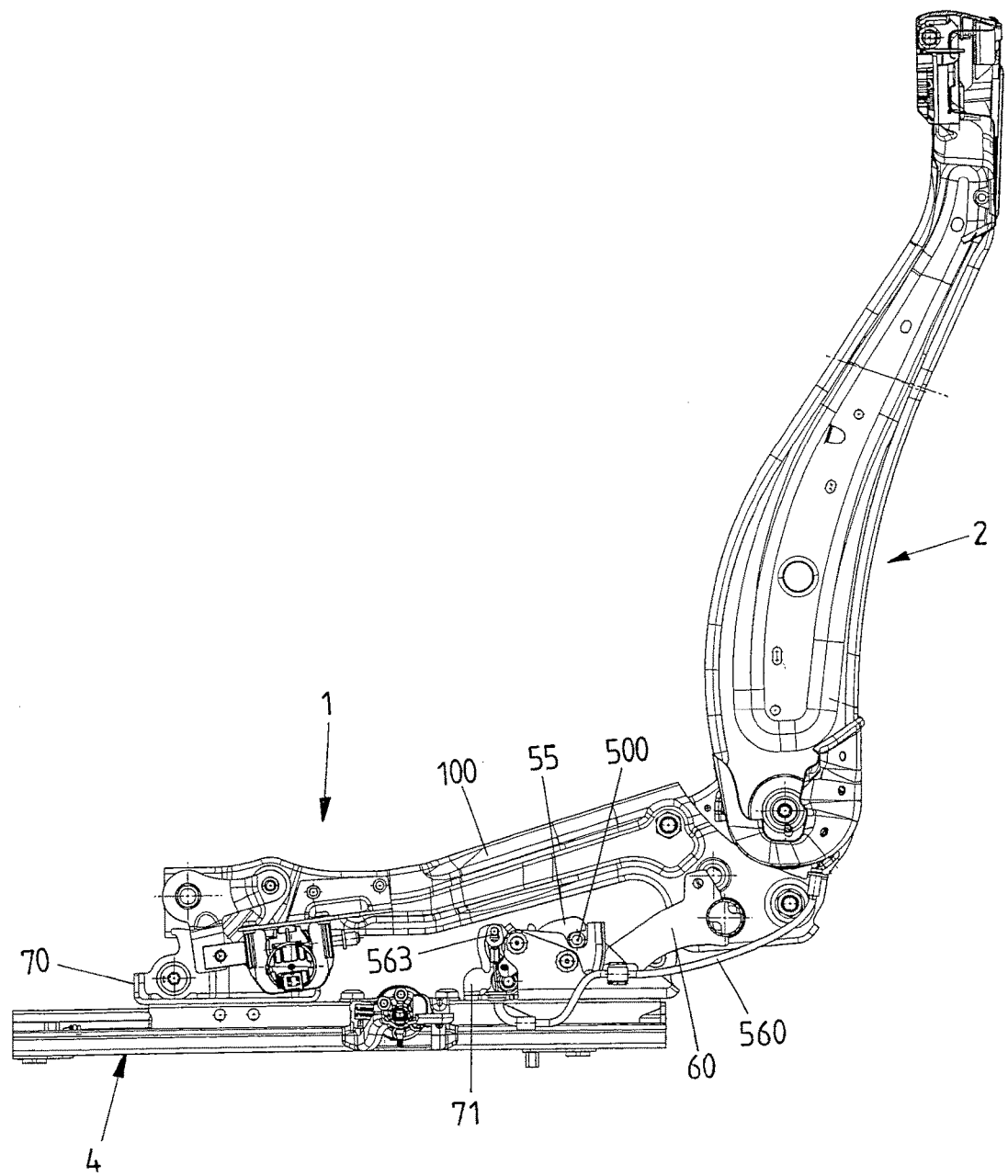
FIG. 4 is a cross-sectional view of the vehicle seat according to section A-A in FIG. 3.
Figure 6A:
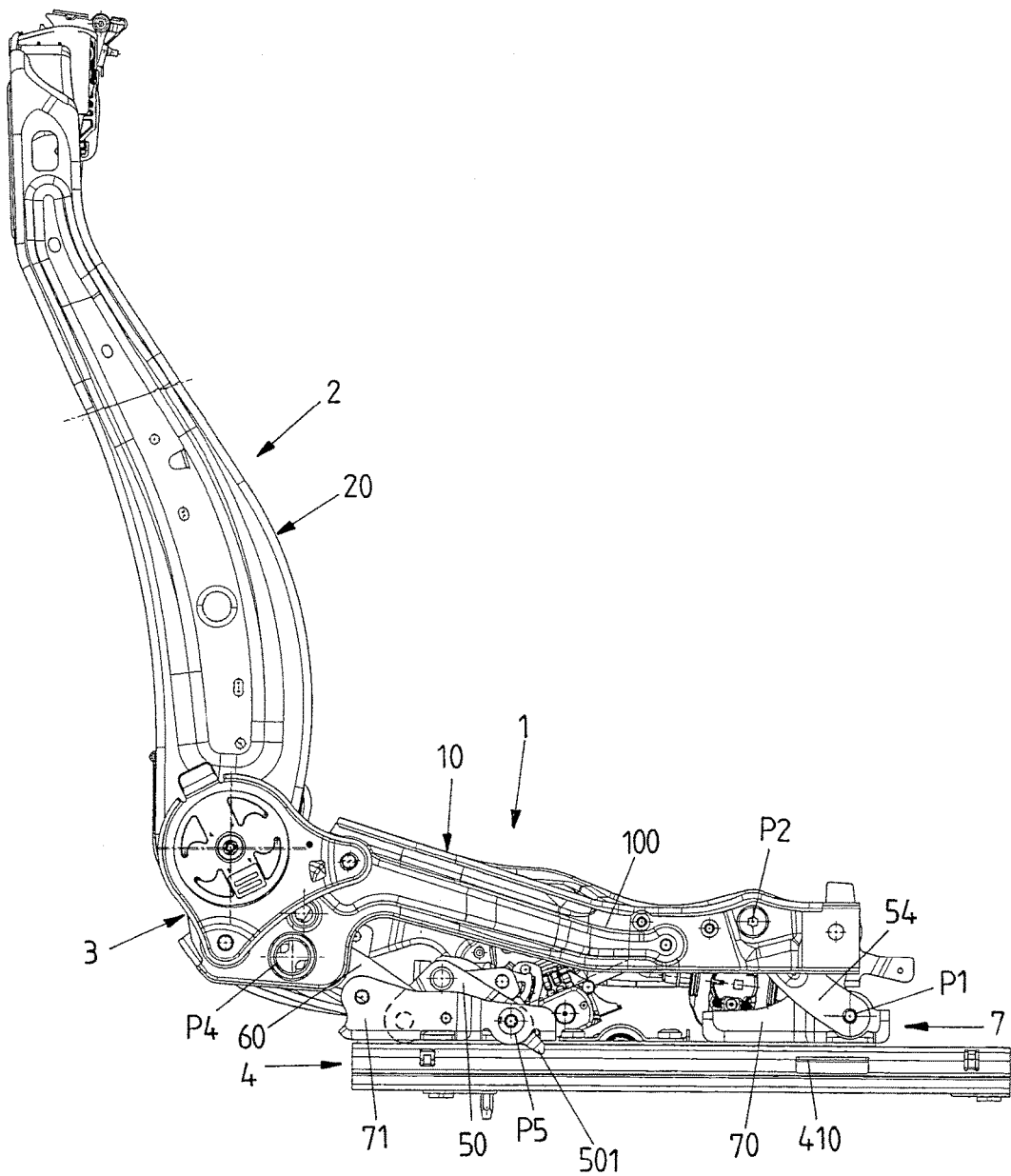
FIG. 6A is a side view on the vehicle seat according to FIG. 1 in a use position.
Figure 6B:
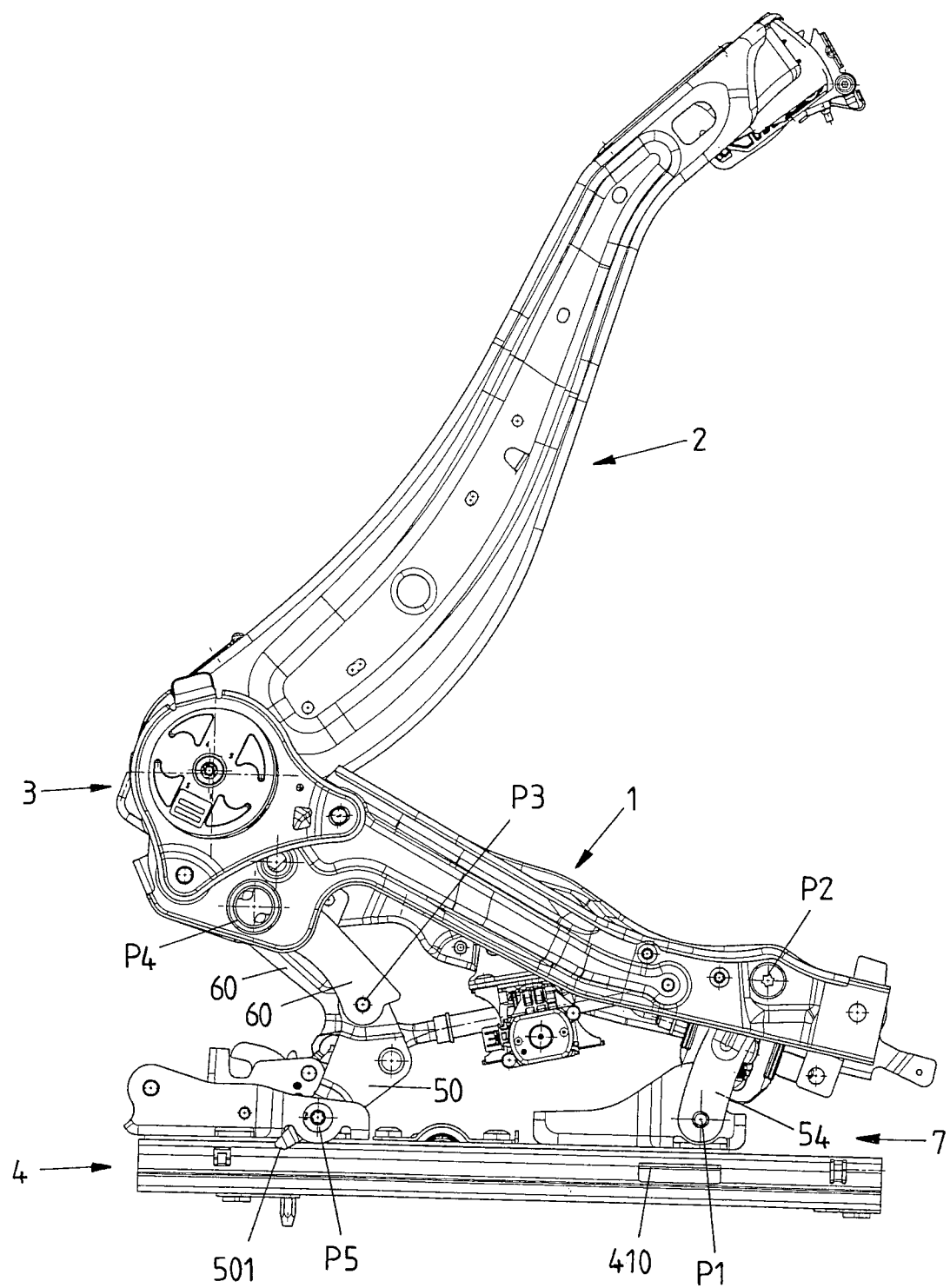
FIG. 6B is a side view on the vehicle seat according to FIG. 1 in an easy-entry position.
Figure 7:
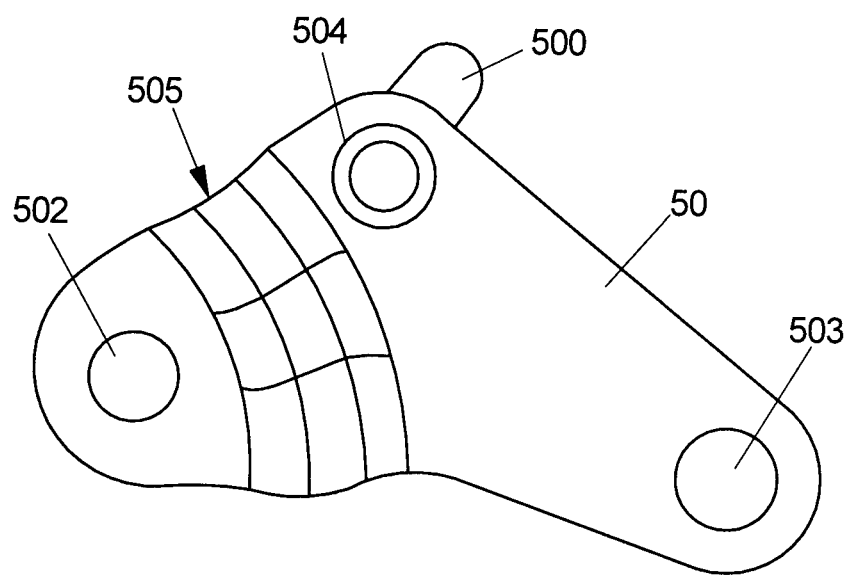
FIG. 7 is a front view of an easy-entry link of the easy-entry mechanism of the vehicle seat according to FIG. 1.

FIG. 7 shows the easy-entry link 50 of the right side of the vehicle seat VS as shown in FIG. 2. The easy-entry link 50 has an elongate and/or triangular shape. The triangular shape has one longest side and two smaller sides. At two opposite ends, the easy-entry link 50 comprises a first opening 502 and a second opening 503. When the easy-entry link 50 is mounted in the vehicle seat VS as shown in FIGS. 1-6B, the first opening 502 is mounted to the height-adjustment link 60 by means of the third pivot bearing P3. The second opening 503 is mounted on the seat base 7 (more precisely on the rear bracket 71 thereof) my means of a fifth pivot bearing P5. The easy-entry link 50 further has a third opening 504 being engaged by a striker wire 500 or bolt or pin. Alternatively, the easy-entry-link 50 and the striker wire 500 may be formed in one piece. The first, second and third openings 502, 503, 504 are arranged in the form of a triangle. The easy-entry link 50 further has a step 505 for an optimized connection to the height-adjustment link 60 (see FIG. 2). Due to the step 500, the first and second openings 502, 503 of the easy-entry link 50 are out of plane (but their opening surfaces are parallel to one another).

The easy-entry link 50 of the left side of the vehicle seat VS as shown in FIG. 2 may be designed symmetrical, in particular identical, to the easy-entry link 50 of the right side of the vehicle seat VS. Alternatively, the left easy-entry link 50 (more generally, one of the two easy-entry links 50) may have a smaller step 505 compared to the other easy-entry link 50, or it may have no such step 505, so that the first and second openings 502, 503 are arranged within the same plane.

On each side of the vehicle seat VS, the easy-entry link 50 is spaced apart from the respective arm 54 along the longitudinal axis X. The arm 54 is arranged at a front end of the vehicle seat VS, and the easy-entry link 50 is arranged at a rear end of the vehicle seat VS, below the backrest portion 2.

FIGS. 1-6A show the vehicle seat VS in the use position. The easy-entry mechanism 5 is locked by means of a latch 55 (on one side or, as shown in FIGS. 1-6B, on both sides of the vehicle seat VS). The latches 55 secure the easy-entry links 50 in the use position, in the present example with the third and fifth pivot bearings P3, P5 arranged along a line parallel to the longitudinal axis. The longest side of the triangular easy-entry link 50 rests against the rear bracket 71.

In the use position, the arms 54 are inclined backwards (see FIG. 6A), in particular pointing towards the backrest portion 2. The upper ends of the arms 54 that are connected with the respective side members 100 are closer to the backrest portion 2 than the lower ends of the arms 54 connected to the front brackets 70 (seen along the longitudinal axis X).

As shown in FIGS. 1-6A, each latch 55 is in engagement with the corresponding striker wire 500 when locking the easy-entry mechanism 5. For displacing the vehicle seat VS into the easy-entry position, the latches 55 are released. For releasing the latches 55, the easy-entry mechanism 5 comprises a release mechanism 56 having latch release (Bowden) cables 560 on either side. By operating the release mechanism, the latches 55 are released and brought out of engagement with the striker wires 500.

The release mechanism 56 comprises an easy-entry handle 562. The easy-entry handle 562 is arranged at an upper region of the backrest portion 2. The easy-entry handle 562 is mounted on the upper crossbar 201 of the backrest frame 20. The easy-entry handle 562 is operatively connected with one recliner 3 (alternatively with both recliners 3) by means of a recliner release (Bowden) cable 561. By operating the easy-entry handle 562, the recliner release cable 561 is operated; more precisely, is pulled. Operating the recliner release cable 561 activates a release link 31 of the recliner 3 to release the recliner 3. A synchronization rod 30 synchronizes the locked or released state of the operated recliner 3 with the other recliner 3. The synchronization rod 30 is arranged adjacent the lower crossbar 202 of the backrest frame 20. Once released, the recliners 3 allow to pivot the backrest portion 2 forward, i.e., towards the seating portion 1.

On each side of the vehicle seat VS, the latch release cable 560 is operatively connected with the backrest portion 2. As particularly shown in FIGS. 1 and 2, an end 564 of the latch release cable 560 is fixed on the backrest frame. The end 564 is fixed at a position eccentric from the pivot axis of the recliner 3. The respective other end of the latch release cable 560 is mounted on a pin 563 of the release mechanism 56. Pulling the pin 563 by means of the latch release cable 560 displaces the latch 55. By pivoting the backrest portion 2 forward (into a dump position), on both sides, the latch release cable 560 is operated and pulls the latch 55 out of engagement with the striker wire 500 of the easy-entry link 50.

After releasing the latches 55, the vehicle seat VS may be moved forward into the easy-entry position as shown in FIG. 6B. The easy-entry links 50 may be rotated (in a forward direction) with respect to the seat base 7, more precisely, with respect to the rear brackets 71. The released easy entry-links 50 rotate about the respective fifth pivot bearing P5. By pivoting the easy-entry links 50 with respect to the seat base 7, the easy-entry links 50 are rotated about the respective third pivot bearing P3 with respect to the corresponding height-adjustment link 60.

The easy-entry links 50 move the seating portion 1 and the backrest portion 2 upward and forward to provide an easy-entry space. In this way, the easy-entry mechanism 5 provides a so-called "bunny hop" function. The easy-entry mechanism 5 may thus be designed as a bunny-hop mechanism.

The arms 54 then pivot (in a forward direction) with respect to the seat base 7, more precisely, with respect to the front brackets 70. The arms 54 rotate around the first pivot bearings P1 with respect to the seat base 7. The arms 54 further rotate about the second pivot bearings P2 with respect to the seat frame 10.

When moving into the easy-entry position, the arms 54 lift the front ends of the side members 100 away from the seat base 7 (and the guide rail assembly 4). As shown in FIG. 6B, the arms 54 are arranged substantially vertical or (slightly) inclined forwards in the easy-entry position. The two pivot bearings P3, P5 on the easy-entry links 50 are arranged substantially vertical or (slightly) inclined forward in the easy-entry position.

By pivoting the backrest portion 2 forward in addition to the displacement of the backrest portion 2 together with the seating portion 1, a larger space may be cleared behind the vehicle seat VS to provide a comfortable and easy entry for occupants.

Optionally, a headrest may be folded forwards by moving the seating and backrest portions 1, 2 into the easy-entry position.

Once released, on each of both sides of the vehicle seat VS, the easy-entry link 50, the arm 54, the seat base 7 and the seat frame 10 side member 100 form a four-bar linkage. The easy-entry links 50 are connected with the seat frame by means of the height-adjustment links 60. As long as the height-adjustment mechanism 6 is not adjusted, the relative position of the height-adjustment links 60 and the seat frame 10 remains constant.

One or more, e.g. two, optional springs 53 may be provided to assist the displacement of the seating portion 1 and the backrest portion 2 from the use position into the easy-entry position. The springs 53 pretension the vehicle seat VS into the easy-entry position, or along the longitudinal axis X. The springs 53 are torsion springs, extension springs, or other types of pre-tensioning elements. FIG. 2 shows a possible arrangement of a spring 53 which elastically pushes against the seat base 7 or the upper rail 40, and against the arm 54.

The easy-entry mechanism 5 according to FIGS. 1-6B may be manually operable. In case of an emergency situation, e.g. in case of an accident, the vehicle seat VS allows a quick exit from rear seats by operating the easy-entry handle 562 and tilting the backrest portion 2 forward. For tilting the backrest portion 2 forward, additional springs may be provided. After releasing the latches 55, the springs 53 assist the forward motion. The vehicle seat VS may be transferred into the easy-entry position particularly quickly so as to provide an emergency exit, in particular from rear seats of the vehicle.

With further reference to FIG. 2, the easy-entry mechanism 5 may optionally, and in addition or alternatively to one or more springs 53, comprise a drive mechanism 57 to displace the vehicle seat VS between the use position and the easy-entry position. The drive mechanism 57 may include a drive motor 570 and a spindle 571. A drive motor 570 and a spindle 571 may be provided on one side or on both sides of the vehicle seat VS. The drive motor 570 may be an electric motor that may be coupled with or simultaneously or successively activated with another drive motor pivoting the backrest portion 2. The latch 55 may be operable by an actuator instead of or in addition to the manual operation with the easy-entry handle 562. In the example shown in FIG. 2, the drive motor 570 is mounted on the seat base 7 or on the upper rail 40 and the spindle 571 (or another element displaced by means of the drive motor 570) urges against the arm 54 so as to rotate the arm 54 forward in the direction of the easy-entry position. To return into the use position, the drive mechanism 57 may pull the arm 54 backwards. The drive mechanism 57 may be designed as a spindle drive, alternatively as a cam drive, rack and pinion drive or another type of drive mechanism.

The drive mechanism 57 may be used to additionally lock the easy-entry mechanism 5 in the use position, in particular by designing the drive mechanism 57 to be self-locking. In this case, an additional latch mechanism, such as the latch 55 may be omitted.

The drive motor 570 may be provided with power by the vehicle. In case of a power failure in the vehicle, e.g. due to an accident of the vehicle (such a case may also be referred to a "panic case"), the vehicle seat VS may still be manually operable. For this purpose, the drive mechanism 57 may be designed non-self-locking. Alternatively or in addition, a decoupling mechanism may be provided that decouples one or more drive motors, such as the drive mechanism 57 drive motor 570, when a user manually operates the easy-entry mechanism 5.

Alternatively or additionally, the drive mechanism 57 may be operable with an additional electric circuit (in addition to the vehicle's power system), in particular with a battery, e.g. a rechargeable battery. By means of the additional electric circuit the vehicle seat VS may be moved between the use position and the easy-entry position by means of the drive mechanism 57, even in case of a power failure of the power system of the vehicle.

When releasing the latch 55 by means of the release mechanism 56, the seating portion 1 and the backrest portion 2 move forward assisted or driven by the spring 53 (or the springs 53), and/or by means of the drive mechanism 57. This motion may be much faster when compared to conventional easy-entry mechanisms using a powered longitudinal adjuster to provide easy entry.

With particular reference to FIGS. 6A and 6B an optional mechanism to lock the easy-entry mechanism 5 in the use position is described in the following.

One or both of the easy-entry links 50 may be provided with a tooth or protrusion 501. The protrusion 501 protrudes from the easy-entry link 50 from that side of the (fifth) pivot bearing P5 connecting the easy-entry link 50 to the seat base 7 facing substantially away from the (third) pivot bearing P3 connecting the easy-entry link 50 to the height-adjustment link 60. In the use position, the protrusion 501 extends forward and downward along an outer surface of the lower rail 41.

The lower rail 41 comprises a platform 410. The platform 410 is arranged at the outer surface of the lower rail 41. As shown in FIGS. 6A and 6B, the platform 410 is arranged within the forward region of the lower rail 41.

When the vehicle seat VS is adjusted in a longitudinal position corresponding to or close to a full-forward position, the protrusion 501 is located above the platform 410. When operating the release mechanism 56 in this position, the protrusion 501 of the easy-entry link 50 abuts against the platform 410. The platform 410 thus prevents a rotation of the easy-entry link 50.

When the vehicle seat is arranged in a full-forward position, depending on the shape of the vehicle, the space to enter a rear row may be large enough and it may not be necessary to additionally activate the easy-entry mechanism 5. Also, and again depending on the shape of the vehicle, an activation of the easy-entry mechanism 5 may let the backrest portion 2 collide with a sunscreen or windshield of the vehicle. To avoid such collisions, the easy entry mechanism may comprise the protrusion 501 and platform 410.

Figure 8:
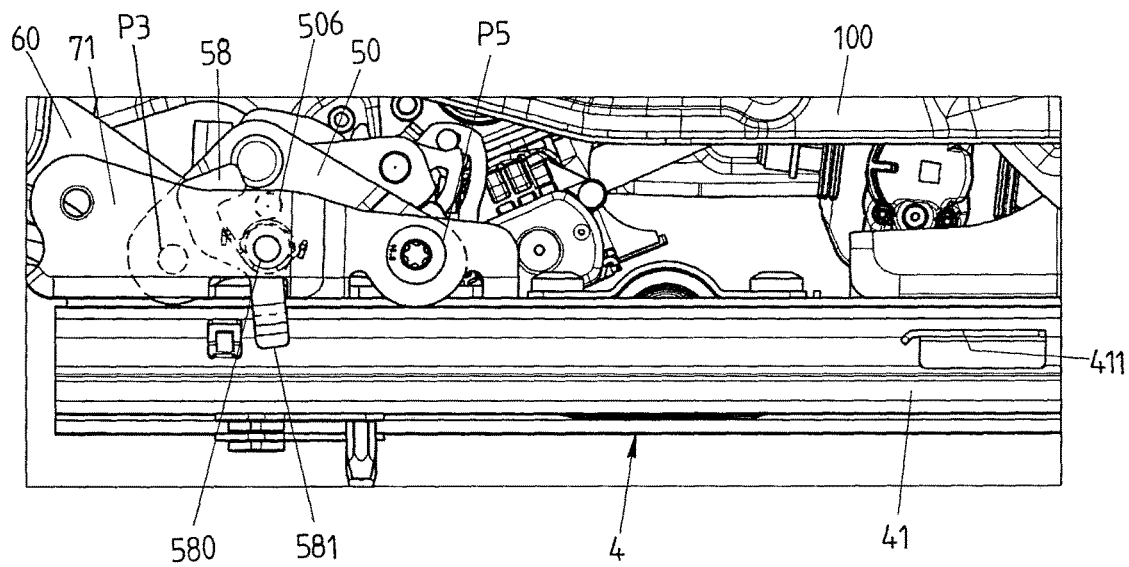
FIG. 8 is a side view of a detail of a vehicle seat having an easy-entry mechanism with releasable latches and an additional interlocking mechanism with the interlock mechanism in an unlocked state.
Figure 9:
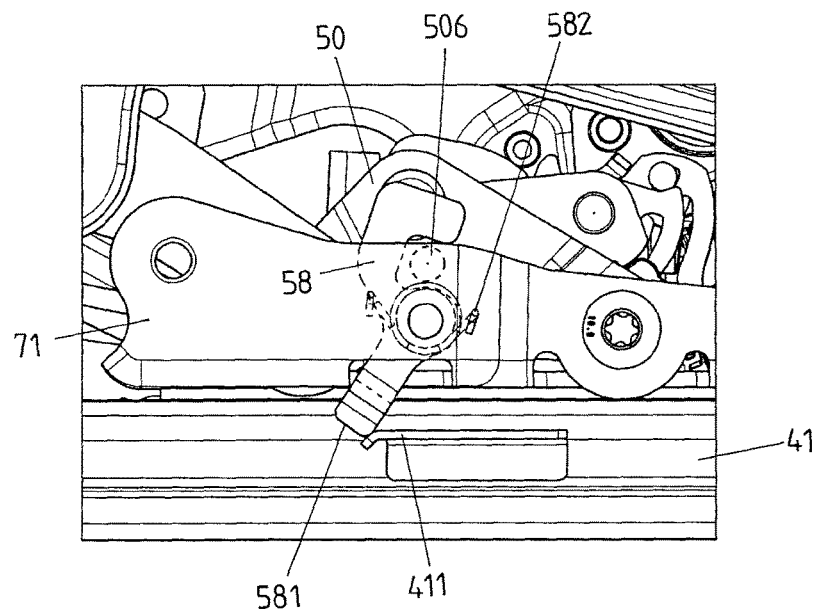
FIG. 9 is a side view of a detail of the vehicle seat according to FIG. 8 with the interlock mechanism in a locked state.

Turning now to FIGS. 8 and 9, another optional mechanism to lock the easy-entry mechanism 5 in the use position is described, which may be arranged at the vehicle seat VS according to FIGS. 1-6B alternatively or additionally to the afore-described mechanism with protrusion 501 and platform 410.

The mechanism according to FIGS. 8 and 9 comprises a guide or ramp 411 at the lower rail 41. The ramp 411 has a platform part with a surface extending along the XY plane. The ramp further has an oblique part. The ramp 411 is arranged within the forward region of the lower rail 41. The mechanism further comprises a pin 506 mounted on the easy-entry link 50. The mechanism further comprises a hook 58. The hook 58 is rotatably mounted on the seat base 7 or upper rail 40. In the example shown in FIGS. 8 and 9, the hook 58 is rotatably mounted on the rear bracket 71. The hook 58 is mounted by means of a bolt 580. The hook 58 has a releasing state (see FIG. 8) in which the hook 58 is not engaged with the pin 506 of the easy-entry link 50. The hook 58 has an interlocking state (see FIG. 9) in which the hook 58 is in engagement with the pin 506 of the easy-entry link 50. In the interlocking state, the hook 58 at least partially encompasses the pin 506. A spring 582 pre-tensions the hook 58 into the releasing state.

The hook 58 further has an arm 581. The arm 581 is arranged to contact the ramp 411 when the vehicle seat VS is adjusted in a longitudinal position corresponding to or close to a full-forward position. By moving the vehicle seat VS into this position (see FIG. 9) the ramp 411 rotates the hook 58 from the releasing state into the locking state.

When the hook 58 is in the locking state, it prevents a rotation of the easy-entry link 50 out of the use position. The pin 506 is secured by the hook 58. This mechanism securely prevents a possible collision of the backrest portion 2 with a sunscreen or windshield of the vehicle.

Alternatively to the above locking mechanisms, a mechanical logic may be provided to activate and deactivate the latch release mechanism 56 of the easy-entry mechanism 5. The mechanical logic may be implemented with several links. For example, within a permitted easy-entry area (e.g. along the longitudinal direction) a latch activation pawl is engaged with the latch release cable 560 (or an alternative linkage). When the vehicle seat VS is in a restricted easy-entry area (e.g. along the longitudinal direction), the easy-entry handle 562 (or another lever) will be disengaged by means of the latch activation pawl. Such an arrangement may reduce forces on the latch release cable 560, the recliner release cable 561 and/or the easy-entry release handle 562 by a misuse.

It is noted that the release mechanism 56 and a drive motor activation mechanism may be located remote from the vehicle seat VS, or at least parts of the release mechanism 56. For example, the easy-entry handle 562 may be arranged at the vehicle floor or at another part of the vehicle. The easy-entry handle 562 may be equipped with an actuator so that operating the actuator releases the latches 55 automatically, and the springs 53 or drive mechanism 57 displace the vehicle seat VS into the easy-entry position.

It is further noted that between each easy-entry link 50 and the corresponding rear bracket 71 another link or swing arm or a plurality of links or swing arms may be pivotably arranged, e.g., to provide a more complex path of the vehicle seat VS into the easy-entry position.

Instead of mounting a locking mechanism such as the latches 55 to the upper rails 41 on, in general, to the guide rail assembly 4, it may also be attached to the easy-entry links 50.

In all embodiments of the vehicle seat, an optional soft locking or clamping mechanism may be provided to hold the vehicle seat VS in the easy-entry position.

What is claimed is:

1. A vehicle seat comprising:
   a seating portion having a seat frame with a pair of frame members and a cross member arranged between the pair of frame members;
   a seat base for supporting the seating portion;
   a height-adjustment mechanism for adjusting a height of the seat frame with respect to the seat base, and comprising at least one height-adjustment link;
   an easy-entry mechanism for displacing the seating portion with respect to the seat base at least along a longitudinal axis between a use position and an easy-entry position, the easy-entry mechanism comprising at least one easy-entry link being pivotably mounted on the seat base and pivotably connected with a respective height-adjustment link, the height-adjustment link connecting the easy-entry link with the cross member;
   a backrest portion pivotably supported on the seating portion; and
   a recliner pivotably connecting the backrest portion with the seating portion, wherein the recliner includes a first recliner part fixedly connected with a frame member of the seat frame and a second recliner part fixedly connected to a backrest frame of the backrest portion, wherein the first recliner part and the second recliner part are rotatably mounted to one another.

2. The vehicle seat of claim 1, wherein the height-adjustment link may be rotated with respect to the seat base for effecting a height adjustment of the seating portion.

3. The vehicle seat of claim 1, wherein the height-adjustment link is fixed to the cross member.

4. The vehicle seat of claim 1, wherein the cross member is pivotably mounted on each of the pair of frame members.

5. The vehicle seat of claim 1, wherein the cross member is a rod or a stamped bracket.

6. The vehicle seat of claim 1, wherein the backrest portion may be adjusted with respect to the seating portion by means of the recliner without displacing the seating portion with respect to the seat base.

7. The vehicle seat of claim 1, further comprising at least one arm being pivotably mounted on the seat base and pivotably connected with the frame member.

8. The vehicle seat of claim 7, wherein the arm is pivotably mounted on the seat base at a first position and the easy-entry link is pivotably mounted on the seat base at a second position, the first and second positions being spaced apart from one another.

9. The vehicle seat of claim 7, further comprising a backrest portion pivotably supported on the seating portion, wherein a recliner pivotably connects the backrest portion with the seating portion, and wherein the easy-entry link is located closer to the recliner than the arm.

10. The vehicle seat of claim 1, the height-adjustment mechanism comprising a pair of height-adjustment links, and the easy-entry mechanism comprising a pair of easy-entry links.

11. The vehicle seat of claim 1, further comprising a guide rail assembly mounted or mountable on a vehicle floor, for adjusting a longitudinal position of the seating portion with respect to the vehicle floor.

12. The vehicle seat of claim 11, further comprising an interlock mechanism locking the easy-entry mechanism in the use position when the vehicle seat is arranged in a full-forward position of the guide rail assembly.

13. The vehicle seat of claim 1, wherein the easy-entry mechanism further comprises a releasable latch or cam lock for restricting and releasing a pivoting motion of the easy-entry link with respect to the seat base.

14. The vehicle seat of claim 13, wherein the latch or cam lock is releasable by at least one of pivoting a backrest portion with respect to the seating portion, by operating a handle, and by adjusting a longitudinal position of the seating portion with respect to the vehicle floor.

15. The vehicle seat of claim 13, wherein a bolt or striker wire is mounted on the easy-entry link, and the latch or cam lock may be engaged with the bolt or striker wire for locking the easy-entry link on the seat base.

16. The vehicle seat of claim 1, wherein the easy-entry mechanism further comprises a spring pre-tensioning the vehicle seat into the easy-entry position, or a drive motor for driving the vehicle seat into the easy-entry position.

17. A vehicle seat, comprising:
a seating portion having a seat frame with a frame member;
a seat base for supporting the seating portion;
a first link having a first end and a second end, the first end being mounted on the seat frame by means of a pivot bearing, so as to be pivotable with respect to the frame member;
an easy-entry mechanism for displacing the seating portion with respect to the seat base at least along a longitudinal axis between a use position and an easy-entry position, and comprising a second link pivotably mounted on the second end of the first link by means of a pivot bearing and pivotably mounted on the seat base;
a backrest portion pivotably supported on the seating portion; and
a recliner pivotably connecting the backrest portion with the seating portion, wherein the recliner includes a first recliner part fixedly connected with a frame member of the seat frame and a second recliner part fixedly connected to a backrest frame of the backrest portion, wherein the first recliner part and the second recliner part are rotatably mounted to one another.

* * * * *